United States Patent [19]

Bartos

[11] Patent Number: 5,080,156

[45] Date of Patent: Jan. 14, 1992

[54] VEHICLE WHEEL AND AXLE ASSEMBLY FOR CONTROLLING AIR PRESSURE IN TIRES WITH SPACES BETWEEN THE BEARING ELEMENTS AND THE RACE MEMBERS INCLUDED IN THE AIR FLOW PATH

[76] Inventor: Josef A. Bartos, 1669 Bronze Knoll Rd., Diamond Bar, Calif. 91765

[21] Appl. No.: 478,922

[22] Filed: Feb. 12, 1990

[51] Int. Cl.5 ............................................. B60C 23/00
[52] U.S. Cl. ..................................... 152/417; 152/415
[58] Field of Search ............... 152/415, 416, 417, 418; 141/38

[56] References Cited

U.S. PATENT DOCUMENTS

| | | |
|---|---|---|
| 2,693,841 | 11/1954 | Webster . |
| 2,931,414 | 4/1960 | Jankowski ........................... 152/417 |
| 2,976,906 | 3/1961 | Kamm et al. . |
| 3,362,462 | 1/1968 | Harnish . |
| 3,705,614 | 12/1972 | Juttner et al. . |
| 4,431,043 | 2/1984 | Goodell et al. . |
| 4,434,833 | 3/1984 | Swanson et al. . |
| 4,498,709 | 2/1985 | Wells et al. . |
| 4,706,090 | 11/1987 | Bartos . |
| 4,730,656 | 3/1988 | Goodell et al. . |
| 4,804,027 | 2/1989 | Runels . |
| 4,883,106 | 11/1989 | Schultz et al. ...................... 152/417 |
| 4,892,128 | 1/1990 | Bartos . |
| 4,932,451 | 6/1990 | Williams et al. ..................... 152/417 |

Primary Examiner—Michael W. Ball
Assistant Examiner—Gregory J. Wilber
Attorney, Agent, or Firm—Body, Vickers & Daniels

[57] ABSTRACT

A wheel and axle assembly is provided for a vehicle having on onboard system for controlling the pressure of air in a tire of the vehicle. The assembly comprises a stationary axle housing and a rotatable hub which carries the vehicle tire and which is mounted on the axle housing for rotation thereabout by first and second axially spaced bearing units each having inner and outer races and tapered roller bearings therebetween. Axially spaced first and second seal assemblies are provided between the axle housing and hub to provide a sealed air chamber therebetween, and one of the bearing units is in the air chamber adjacent the first seal assembly which is connected to a source of air under pressure on the vehicle. The flow path extends through the air chamber and includes a port in the hub opening into the chamber and connected in flow communication with the vehicle tire. The seal arrangement relative to the one bearing unit provides for the flow path for air between the onboard system and the vehicle tire to include the spaces between the bearing elements and the inner and outer bearing races of the one bearing unit.

33 Claims, 2 Drawing Sheets

VEHICLE WHEEL AND AXLE ASSEMBLY FOR CONTROLLING AIR PRESSURE IN TIRES WITH SPACES BETWEEN THE BEARING ELEMENTS AND THE RACE MEMBERS INCLUDED IN THE AIR FLOW PATH

BACKGROUND OF THE INVENTION

This invention relates to the art of onboard tire inflating and deflating systems for vehicles and, more particularly, to a wheel and axle assembly providing an improved air flow path for the flow of air to and from a vehicle tire across fixed and rotating parts of the wheel and axle assembly.

It is of course well known to provide a vehicle with an onboard system and apparatus to enable the vehicle operator to inflate, deflate and/or check the pressure of the vehicle tires with the vehicle at rest or in motion. Such systems and apparatus include a source of air under pressure carried on the vehicle, appropriate valving and controls for the flow of air to and from the vehicle tires, and sealing arrangements between fixed and rotating components of the wheel and axle assemblies of the vehicle to provide for the delivery of air under pressure to or from the vehicle tires without leakage of air to atmosphere between the sealed surfaces of the fixed and rotating parts.

The parts of each wheel and axle assembly for which such sealing arrangements are required include the fixed axle or axle housing of the vehicle and the rotatable hub assembly which carries the corresponding vehicle tire and is mounted on the axle housing for rotation about the axis thereof by means of a pair of axially spaced apart roller bearing units. In addition to sealing the juncture between the axle and hub components of the vehicle wheel assembly, it is of course necessary to provide a flow path for air between the onboard system and the sealed area and between the sealed area and the vehicle tire. It will be appreciated that these portions of the air flow path are respectively associated with the fixed axle and rotatable hub components of the wheel and axle assembly.

While serving the intended function, arrangements heretofore devised to provide a sealed air flow path between the onboard air supply and the tires of a vehicle have been structurally complex and expensive, and have required special designs or major modifications of otherwise standard vehicle axle, hub and/or bearing components. Such designs and modifications often result in component parts which are limited in use to a given wheel and axle assembly design for a given onboard tire inflating and deflating system. Furthermore, such special modifications or designs, in addition to being expensive, can effect the structural integrity of component parts of a wheel and axle assembly, can void manufacturer's warranties with regard to such component parts if the modifications take place subsequent to manufacture, and do not lend to the efficient and economical retrofitting of a vehicle to provide the latter with an onboard tire inflating and deflating system. More particularly with regard to such disadvantages, the air flow path arrangements heretofore provided have included air flow passageways bored through fixed axle components to deliver air to an area interiorly of the hub and at which point the hub and axle are sealed and the hub provided with a passageway leading from the sealed area to the corresponding vehicle tire. Such arrangements are shown for example in U.S. Pat. Nos. 2,976,906 to Kamm et al; 3,362,452 to Harnish; 3,705,614 to Juttner et al.; and, 4,498,709 to Wells et al. The provision of an air flow bore through the fixed axle component as shown in the latter patents requires a special axle component for a vehicle having an onboard tire inflating and deflating system. Accordingly, a manufacturer providing vehicles both with and without onboard inflating and deflating systems cannot have a standard axle component for both vehicle types. Furthermore, it is time consuming, expensive and perhaps undesirable to retrofit a vehicle to provide an onboard tire inflating and deflating system in accordance with such prior art. In this respect, replacing the existing vehicle axle component is time consuming and expensive and it is both time consuming and extremely difficult to provide the required bore or bores in an existing axle and/or hub components. Moreover, such boring of these parts could well void the manufacturer's warranty with regard thereto.

Other air flow path arrangements heretofore contemplated include those shown in my U.S. Pat. No. 4,705,090 and in my co-pending patent application Ser. No. 286,041 filed Dec. 19, 1988 entitled "Vehicle Wheel Seal Assembly", issued Jan. 9, 1990 as U.S. Pat. No. 4,892,128, the disclosures of which patent and application are incorporated herein by reference. In both my patent and application, axially engageable seal members on the fixed axle and rotating hub components of a wheel and axle assembly communicate the onboard system with the vehicle through axially extending passageways bored in the hub component. While limited to the hub component and parts attached thereto, such boring nonetheless is a special operation in connection with providing original vehicle equipment having an onboard tire inflating and deflating system and, just as importantly and as with the other prior art arrangements, does not lend to efficient or economic retrofitting of a vehicle to provide the latter with such a system. Yet another air flow arrangement heretofore contemplated is shown in U.S. Pat. No. 4,730,656 to Goodell et al. wherein the air flow path between the onboard system and vehicle tire includes a fitting attached to and a bore through the inner race of one of the wheel bearing units. The air path further includes an air chamber between the wheel bearings and which is defined in part by seals mounted on the outer races of the two bearing units and engaging extensions on the inner races of the two bearing units, whereby it will be appreciated that this arrangement requires major modifications of standard bearing designs and special seal units in connection therewith which are not only expensive but limited in use. Furthermore, the bore through the inner race is subject to stress during vehicle operation which can cause bearing failure and, in any event, is likely to shorten the fatigue life of the bearing.

SUMMARY OF THE INVENTION

In accordance with the present invention, the wheel and axle assembly of a vehicle having or retrofitted to have an onboard tire inflating and deflating system is provided with sealing arrangements which provide an air flow path from the fixed axle component to the corresponding tire through the hub component in a manner which, for a given wheel and axle assembly, eliminates any major structural modifications of the component parts of the axle, wheel bearing units and hub of the wheel and axle assembly. In accordance with preferred embodiments, a manufacturer does not have to have both regular and special axle, hub and/or bearing units and, in connection with retrofitting the wheel and axle assembly of a vehicle to provide the vehicle with an onboard tire inflating and deflating system, no structural modifications of these parts are necessary which would reduce the structural integrity thereof or void a manufacturer's warranty with respect thereto.

The foregoing capabilities and advantages are achieved in accordance with the present invention by providing a sealed air chamber between the fixed and rotating parts of a vehicle wheel and axle assembly and which chamber includes at least one of the roller bearing units located therein such that the flow path for air to the tire from a source on the vehicle is axially across the one bearing unit through the radial space between the inner and outer races thereof and through the spaces between the circumferentially adjacent bearing elements thereof. The air chamber is defined by first and second sealing arrangements between the fixed axle and rotating hub components, and the air chamber is connected in flow communication with the vehicle tire through a single radial bore in the hub component.

By providing for the space between the bearing elements and the inner and outer races of the one bearing unit to define a portion of the flow path for air to and from the vehicle tire, the same axle, hub and bearing components can be used in connection with both the original construction of a vehicle to have an onboard tire inflating and deflating system and the retrofitting of a vehicle to include such a tire inflating and deflating system. In this respect, the only modification of these parts that is necessary to provide an air passageway through the wheel and axle assembly of the vehicle is to provide the single radial bore through the hub component to communicate the air chamber with the vehicle tire. This bore can be provided in connection with manufacturing of the hub component and, if the vehicle as manufactured does not have an onboard tire inflating and deflating system, the bore can be plugged to facilitate a subsequent retrofitting operation. Even if not provided in connection with manufacturing of the hub component, such a radial bore through the hub is simply and readily achieved in connection with a retrofitting operation. Moreover, the invention is applicable to different manufacturer's designs for axle, bearing and hub components and does not require specially designed or constructed forms of these components to provide a vehicle with an onboard tire inflating and deflating system. In addition to the foregoing advantages, the time consuming, costly and structurally undesirable provision of air flow passageways through the fixed axle, bearing and/or rotating hub components is eliminated together with the reduction in structural integrity and loss of manufacturer's warranty if such passageways are provided as modifications in connection with a retrofitting operation.

The only additional component parts required in accordance with the present invention are seal components to provide the sealed air chamber between the fixed axle and rotating wheel assembly and the flow path for air therethrough between the onboard system and vehicle tire. Furthermore, while the seal components are designed in accordance with design and dimensional parameters dictated by the vehicle wheel and axle assembly, they are more readily and economically provided than are specially designed or modified axle, hub and/or bearing components. Moreover, in connection with the preferred embodiments the same seal components can be used in connection with providing a vehicle with an onboard tire inflating and deflating system during manufacture of the vehicle or in connection with retrofitting a vehicle to have such a system. It will be appreciated that the ability to retrofit a vehicle to provide an onboard tire inflating and deflating system without replacement and/or major structural modification of one or more of the fixed axle, hub and bearing units simplifies the retrofitting operation and enables retrofitting to be achieved more readily and economically than heretofore possible.

It is accordingly an outstanding object of the present invention to provide the wheel and axle assembly of a vehicle having or retrofitted to have an onboard tire inflating and deflating system with an improved arrangement for delivering air to and from the vehicle tire across fixed and rotating parts of the wheel and axle assembly.

Another object is the provision of an improved arrangement of the foregoing character for delivering air to and from a vehicle tire across fixed and rotating parts of the wheel and axle assembly which minimizes structural modifications of the wheel and axle assembly to achieve such air flow.

Yet another object is the provision of an improved arrangement for delivering air to and from a vehicle tire across fixed and rotating parts of the wheel and axle assembly thereof which enables modification of an existing vehicle wheel and axle assembly to provide such flow by providing a single bore radially through the hub component of the wheel assembly and by adding seal arrangements providing a sealed air chamber and a flow path for air between the onboard system and the vehicle tire which includes the space between the bearing elements and the space between the inner and outer races of one of the bearing units of the wheel and axle assembly.

Still another object is the provision of an improved arrangement of the foregoing character which includes a sealed air chamber between the fixed and rotating parts of the wheel and axle assembly defined in part by a seal arrangement which provides for at least one of the roller bearing units to be located within the chamber such that the flow path for air between the onboard system and the vehicle tire includes the space between the bearing elements and the space between the inner and outer races of the one bearing unit.

Yet a further object is the provision of an improved arrangement of the foregoing character which enables the original manufacture or the retrofitting of a vehicle to provide an onboard tire inflating and deflating system to be achieved while maintaining optimum structural integrity of the component parts of the wheel and axle assembly, minimizing structural modification thereof, and enabling such original manufacture or retrofitting to be more readily and economically obtained than heretofore possible.

Still another object is the provision of an improved arrangement of the foregoing character which enables both the original manufacture and the retrofitting of a vehicle to have an onboard tire inflating and deflating system to be achieved using the same component parts.

BRIEF DESCRIPTION OF THE DRAWINGS

The foregoing objects, and others, will in part be obvious and in part pointed out in greater detail hereinafter in conjunction with the description of preferred embodiments of the invention illustrated in the accompanying drawings in which.

DESCRIPTION OF THE PREFERRED EMBODIMENTS

Figure 1:
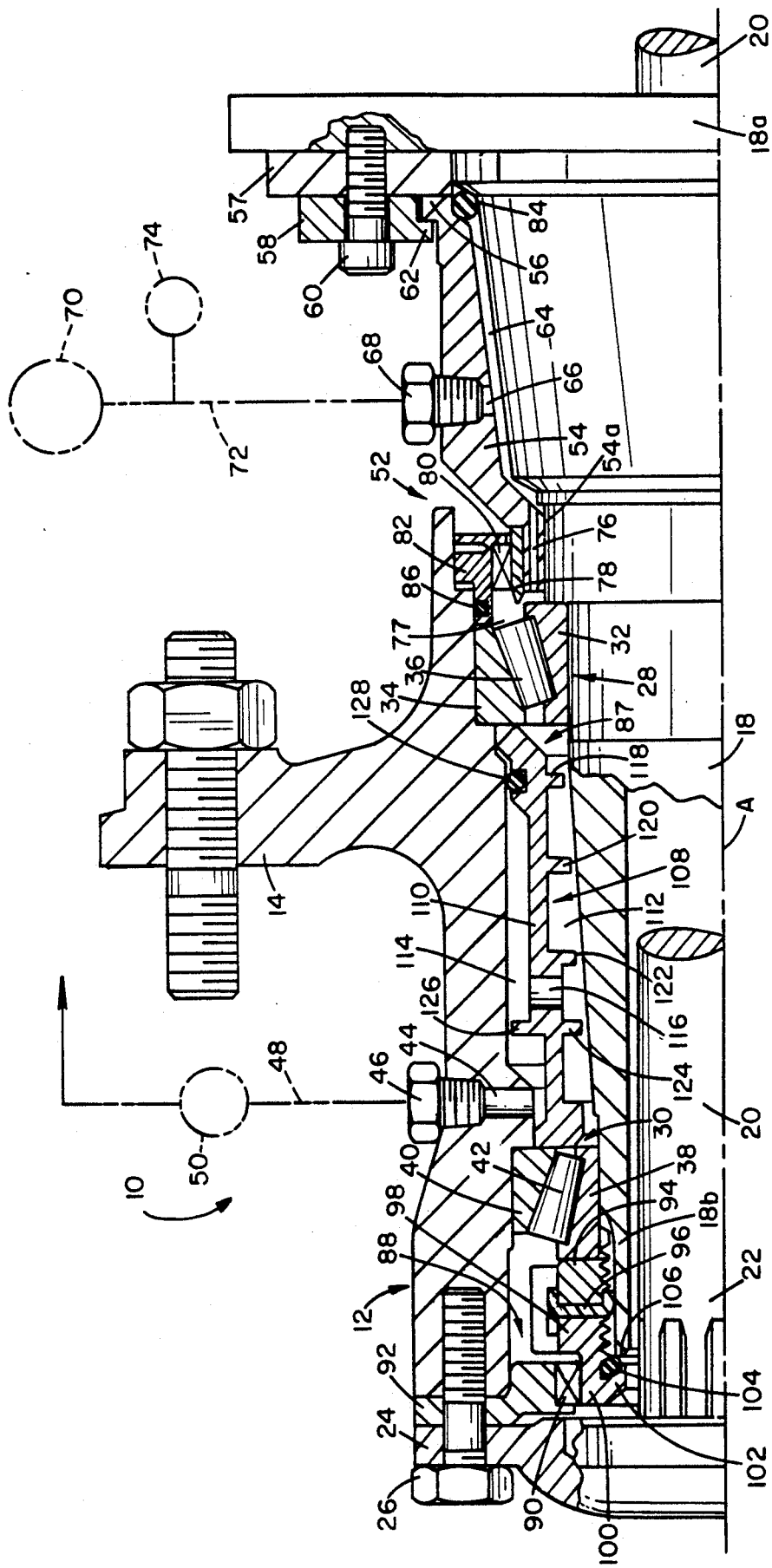
FIG. 1 is a sectional elevation view of a portion of a vehicle wheel and axle assembly having an air delivery arrangement in accordance with one embodiment of the present invention; and, FIG. 2 is a sectional elevation view of a portion of a wheel and axle assembly having an air delivery arrangement in accordance with another embodiment of the invention.

Referring now in greater detail to the drawings wherein the showings are for the purpose of illustrating preferred embodiments of the invention only and not for the purpose of limiting the invention, FIG. 1 illustrates one embodiment of a wheel and axle assembly according to the invention and which includes a wheel assembly 10 comprising an annular hub component 12 having an annular flange 14 to which is mounted a rim, not shown. In a well known manner, the rim component carries a pneumatic tire which is not shown. Wheel assembly 10 is rotatably mounted on a tubular axle housing 18 having an axis A, an axially inner end including a flange 18a secured to the vehicle chassis, not shown, and an axially outer end 18b. Axle housing 18 is a nonrotatable component and, as is well known, a drive shaft 20 extends through the axle housing coaxial with axis A and has an axially splined outer end 22 interengaged with a drive cap member 24 secured to hub component 12 such as by bolts 26. Accordingly, it will be appreciated that rotation of drive shaft 20 about axis A imparts rotation to wheel assembly 10 about the latter axis.

Hub component 12, in a conventional manner, is rotatably supported on axle housing 18 by means of axially spaced apart roller bearing units 28 and 30. Roller bearing unit 28 is comprised of an inner race 32, an outer race 34 and tapered roller bearing elements 36, and roller bearing unit 30 is comprised of an inner race 38, an outer race 40 and tapered roller bearing elements 42 radially therebetween. Hub component 12 is provided with a radial bore 44 opening into the interior of the hub component axially between bearing units 28 and 30. The radially outer end of bore 44 is threaded to receive a fitting 46 which is adapted to be connected in flow communication with the corresponding vehicle tire through a flow line 48 and, preferably, across a tire isolating valve 50 as schematically represented in FIG. 1. As will become apparent hereinafter, bore 44, coupling 46, flow line 48 and valve 50 accommodate the flow of air under pressure to and from the vehicle tire in connection with operation of the onboard tire pressure control system of the vehicle.

In accordance with the present invention and with respect to the space between bearing units 28 and 30, a first seal assembly 52 is provided between the fixed and rotating parts of the wheel and axle assembly axially outwardly adjacent one of the bearing units which, in the embodiment shown in FIG. 1, is bearing unit 28. The first seal assembly facilitates the transmission of air across the juncture between the fixed and rotating parts of the vehicle wheel and axle assembly relative to a source of air under pressure during operation of the tire pressure control system. More particularly in this respect, the first seal assembly includes an annular sleeve 54 surrounding and releasably mounted on axle housing 18. For this purpose, the axially inner end of sleeve 54 is provided with a radially outwardly extending peripheral mounting flange 56 which engages against an annular spacer ring 57, and sleeve 54 is releasably secured to flange 18a by means of a plurality of retaining plates 58 spaced apart about mounting flange 56 and corresponding bolts 60. Each of the plates 58 has a radially inwardly extending finger 62 overlapping flange 56, whereby the retaining plates clampingly engage sleeve 54 against flange 18a. Sleeve 54 provides an annular chamber 64 with the outer surface of axle housing 18, and a bore 66 opens into chamber 64 and is provided with a coupling 68 by which bore 66 is connected in fluid flow communication with a source 70 of air under pressure by means of an appropriate flow line 72, as schematically shown in FIG. 1. Preferably, flow line 72 is adapted to be connected to atmosphere through a deflating valve 74 for the purpose set forth hereinafter. The axially outer end 54a of sleeve 54 is in the form of an annular collar extending about the corresponding portion of axle housing 18 and provided with a plurality of circumferentially spaced air flow passageways 76. Passageways 76 extend axially through the collar and connect chamber 64 in air flow communication with annular space 77 extending about the axially inner side of bearing unit 28. The outer periphery of end 54a of sleeve 54 is provided with a wear ring 78 of suitable material such as hardened steel. An annular face seal member 80 of suitable elastomeric material is carried by hub 12 and sealingly engages the radially outwardly facing surface of ring 78, whereby the ring and seal member seal the juncture between the fixed sleeve 54 and rotating hub 12. Seal member 80 is mounted on hub 12 for rotation therewith by means of an annular mounting collar 82 to which seal member 80 is secured and which collar is removably secured to hub 12 such as by an interference fit therewith. Leakage of air along the outer surface of axle housing 18 from chamber 64 is precluded by an O-ring seal 84, and leakage along the interface between mounting collar 82 and hub 12 is precluded by an O-ring seal 86.

Further in accordance with the invention, a second seal assembly is provided between the fixed and rotating components of the wheel and axle assembly and, together with seal assembly 52, provides a sealed air chamber 87 between the fixed and rotating components. In the embodiment shown in FIG. 1, the second seal assembly is designated in general by the numeral 88 and includes an annular face seal member 90 of suitable elastomeric material secured to a mounting ring 92 which is captured between hub 12 and end cap 24 for rotation therewith. As is well known, the axially outer end 18b of axle housing 18 is externally threaded to removably receive bearing retaining components including an inner nut 94, a washer 96 and an outer end nut member 98. In this embodiment, end nut 98 includes an axially outwardly extending annular collar 100 which terminates in a radially and axially inwardly extending flange 102. Collar 100 provides a circumferentially extending radially outwardly facing sealing surface which is sealingly engaged by seal member 90. Second seal assembly 88 further includes an O-ring seal member 104 which is axially compressed and sealingly engaged between the axially outer end face 106 of end portion 18b of the axle housing and the axially inner surface of flange 102 of end nut 98.

It will be appreciated from the foregoing description that the sealed air chamber 87 defined by seal assemblies 52 and 88 and by the radially outer surface of axle housing 18 and the radially inner surface of hub 12 between the seal assemblies is adapted to be connected in air flow communication with air source 70 across the seal members of seal assembly 52, and is adapted to be connected in air flow communication with the corresponding vehicle tire through bore 44 in hub 12. Preferably, the sealed air chamber is provided with a grease baffle arrangement to direct the flow of air through the air chamber to and from the vehicle tire in a manner which minimizes entrainment of bearing grease in the air flowing through the chamber. In the embodiment illustrated in FIG. 1, this is achieved by an annular grease baffle 108 of lightweight material such as aluminum and which is comprised of an annular sleeve 110 extending axially between the outer races of bearing units 28 and 30 and dividing the radial space between axle housing 18 and hub 12 into inner and outer hub chambers 112 and 114, respectively. Sleeve 110 is provided between its axially opposite ends with a radial opening 116 between chambers 112 and 114, and is provided with axially spaced apart annular baffle walls 118, 120, 122 and 124 extending radially inwardly therefrom into chamber 112, and an annular baffle wall 126 extending radially outwardly therefrom into chamber 114. Baffle walls 118, 120 and 122 are axially between bearing unit 28 and opening 116, and wall 126 is axially between opening 116 and bore 44. The radially inner circumferential edges of walls 118, 120, 122 and 124 are closely spaced from the outer surface of the underlying portion of axle housing 18, such spacing for example being about 0.030 inch, and it will be noted in the embodiment disclosed that the inner hub contour provides for the radially inner end of bore 44 to be closely spaced from the outer surface of sleeve 110. Preferably, to stabilize or dampen vibration of the grease baffle, an elastomer ring is provided in an annular recess therefor in one of the axially opposite ends of sleeve 110, such as the O-ring 128 shown in FIG. 1.

In accordance with the present invention, and as will be appreciated from the embodiment illustrated in FIG. 1, the seal assemblies and the location and function of seal assembly 52 provide a flow path for air between the vehicle tire and source 70 which includes the radial space between bearing races 32 and 34 of bearing unit 28 and the circumferential spaces between adjacent ones of the bearing elements 36 thereof. More particularly in this respect, and with regard to a tire inflating operation for example, air under pressure from source 70 flows through line 72 and bore 66 to chamber 64 and thence across seal assembly 52 by flowing through ports 76 into annular space 77. The air then flows axially across bearing unit 28 through the radial space between the inner and outer races thereof and the space between the circumferentially adjacent tapered roller bearing elements 36 and into the air chamber 87. More particularly, the air flows into inner hub chamber 112 then axially beneath annular baffle walls 118, 120 and 122 to opening 116 and thence radially outwardly through the opening to outer hub chamber 114. The air then flows axially across baffle wall 126 and radially inwardly toward sleeve 110 so as to enter the inner end of bore 44 for flow therethrough to the vehicle tire. In the absence of a grease baffle, of course, the air would flow through the hub chamber 87 directly from the axially outer side of bearing unit 28 to the inner end of bore 44. It will be further appreciated that in connection with a tire deflating operation, achieved by opening deflate valve 74 to exhaust air from the tire to atmosphere through the latter valve, the direction of air flow between the tire and valve 74 and through the hub air chamber is reversed from that described in connection with a tire inflating operation.

Grease baffle 108 functions to maintain bearing grease in inner hub chamber 112 while facilitating the flow of air along a circuitous path through the inner and outer hub chambers to minimize the entrainment of grease in the air stream. The grease baffle further serves to facilitate separation of grease from air in outer hub chamber 114 should grease become entrained in the air stream flowing between the inner and outer chambers. The grease baffle also directs the flow of air through outer chamber 114 to bore 44 such as to further minimize the possibility of entrainment of grease in the air stream flowing through bore 44 to the vehicle tire. With further regard to these functions, it will be appreciated that the bearing grease is relatively viscous and stable when the vehicle is not in motion and is subject to centrifugal force when the vehicle is in motion, whereby centrifugal force together with the viscous nature of the grease tends to maintain the grease in the radially inwardly open pockets of the grease baffle defined in inner chamber 112 by the baffle walls therein. Centrifugal force and the viscous nature of the grease likewise tend to maintain any grease entering outer chamber 114 against the radially outer wall of the chamber. Furthermore, the positioning of the inner end of bore 44 close to sleeve 110 together with the radial overlapping relationship between the inner end of the bore and the radially outer edge of baffle wall 126 causes the air flowing between bore 44 and opening 116 to follow a circuitous path which minimizes the likelihood of any grease in outer chamber 114 becoming entrained in the air stream entering bore 44 during tire inflation, or entering opening 116 during a tire deflating operation.

With further regard to the embodiment illustrated in FIG. 1, the axle housing, hub and bearing units are standard parts which require no structural modification to provide the sealed air chamber and air flow path capabilities described hereinabove, other than to provide the single radial bore 44 through the hub to receive fitting 46. Seal assembly 52 is constructed for mounting on the existing axle housing and hub components without any structural modification of the latter. Seal assembly 88 requires a modified outer end nut 98 to provide sealing collar 100 and flange 102, but does not require any modification of axle housing 18 or hub 12. Grease baffle 108 is of course a component manufactured for the specific purpose described above, but is designed to be received between bearing units 28 and 30 and the axle housing and hub components in a manner which does not require any structural modification of these components to accommodate the grease baffle.

Figure 2:
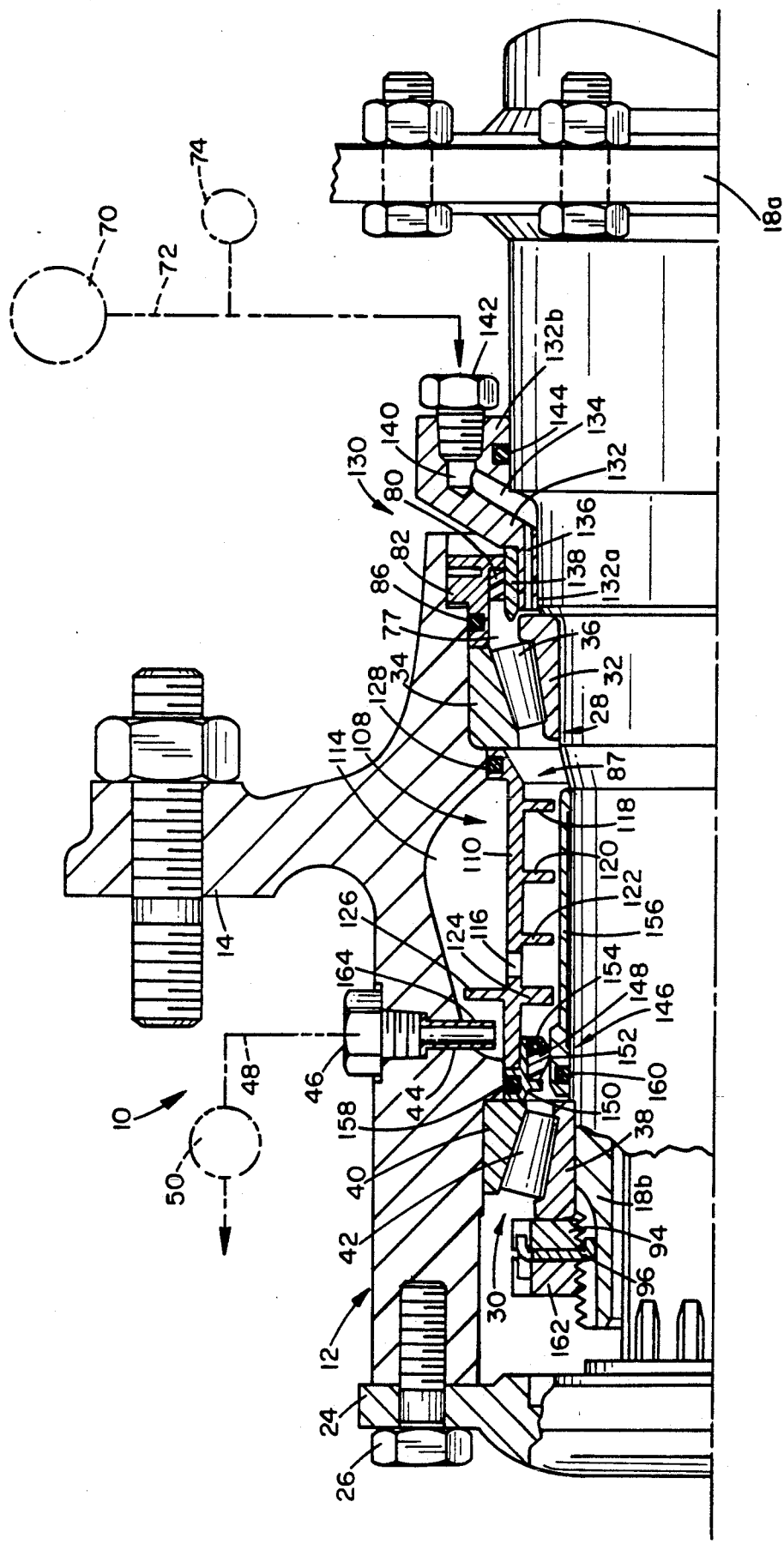

Referring now to FIG. 2 of the drawing, there is illustrated a wheel and axle assembly basically similar to that described hereinabove in connection with FIG. 1, whereby component parts of the wheel and axle assembly in FIG. 2 corresponding to those described above in connection with FIG. 1 are identified by like numerals. In the embodiment shown in FIG. 2, the first seal assembly 130 axially inwardly adjacent bearing unit 28 incorporates a modification of the sleeve component 54 of the first seal assembly 52 in FIG. 1. In this respect, seal assembly 130 includes an annular sleeve 132 mounted such as by a press fit on the inner end of axle housing 18 axially outwardly of flange 18a. Sleeve 132 provides an annular chamber 134 with the outer surface of the axle housing, and the axially outer end 132a of the sleeve is in the form of an annular collar extending about the corresponding portion of axle housing 18 and provided with a plurality of circumferentially spaced air flow passageways 136 which extend axially through the collar and connect chamber 134 in air flow communication with annular space 77 extending about the axially inner side of bearing unit 28. Further, outer end 132a is provided with an annular wear ring 138. The axially inner end 132b of the sleeve is provided with a bore 140 receiving a fitting 142 by which the sleeve is connected in flow communication with air source 70 through line 72. In the embodiment of FIG. 2, the juncture between fixed sleeve 132 and rotating hub component 12 is sealed as shown in FIG. 1 by annular seal member 80 mounted on hub 12 and engaging the outer surface of wear plate 138 on sleeve 132. Leakage of air between axle housing 18 and sleeve 132 is precluded by an O-ring seal 144 which seats in an annular recess provided therefor in the sleeve.

The second seal assembly 146 in FIG. 2 comprises an annular lip-type seal member 148 of elastomeric material mounted axially inwardly adjacent bearing unit 30 by means of a mounting ring 150. Seal member 148 has a radially inwardly facing sealing lip 152 biased radially inwardly relative to axle housing 18 by means of an embedded garter spring 154. Preferably, an annular wear sleeve 156 is provided about axle housing 18 for engagement with sealing lip 152. Wear sleeve 156 is received on the axle housing so as to be fixed against rotation relative thereto. Seal assembly 146 further includes an O-ring seal 158 between mounting ring 150 and the inner surface of hub 12, and an O-ring seal 160 between the outer surface of axle housing 18 and the inner surface of wear sleeve 156. Seals 148, 158 and 160 preclude leakage of air axially to bearing unit 30. This seal arrangement replaces the second seal arrangement 88 in FIG. 1 and accordingly provides for the use of a standard outer end nut 162 for retaining the wheel assembly on axle housing 18.

It will be noted in FIG. 2 that the radially outer surface of hub chamber 114 is of an arcuate contour which provides for bore 44 through the hub to have an inner end spaced radially outwardly of baffle wall 126. Accordingly, to obtain the desired air flow through the chamber, bore 44 is provided with a bushing 164 having an inner end which extends radially inwardly toward sleeve 110 so as to radially overlap with baffle wall 126. It will likewise be noted that the end of sleeve 110 of the grease baffle adjacent bearing unit 30 is slightly modified to accommodate seal mounting ring 150 and, in connection therewith, it will be appreciated that sleeve 110 could be modified to provide the mounting support for seal member 148 which is provided by ring 150.

As will be appreciated from the description hereinabove of the flow of air relative to the fixed and moving parts in the embodiment of FIG. 1, the path of air flow in the embodiment of FIG. 2 includes the radial space between the inner and outer bearing races of bearing unit 28, whereby air flows axially across bearing unit 28 between circumferentially adjacent roller bearing elements 46 thereof. Otherwise, the flow of air and the control of the direction of flow through hub chambers 112 and 114 is as described in conjunction with the embodiment of FIG. 1. Further in connection with the embodiment of FIG. 2, it will be appreciated that the only modification of the existing vehicle wheel and axle assembly required to provide the vehicle with a tire inflating and deflating system is the radial bore 44 in hub 12 for bushing 164 and coupling 46. No modification of the axle housing, the end nut thereon, or the bearing units is necessary.

While the embodiments disclosed herein include a grease baffle 108, it will be appreciated that other flow directing arrangements can be provided in the hub chamber to serve the same purpose and that other grease baffle structures and configurations can likewise be devised to control the direction of flow of air through the sealed air chamber. Still further, it will be appreciated that other seal assembly arrangements can be devised which enable providing a sealed air chamber in accordance with the present invention, it only being essential in connection therewith that the sealed air chamber defined by the seal assemblies include one of the wheel bearing units associated with one of the seal assemblies such that air flows through the radial space between the inner and outer bearing races and thus axially across the one bearing unit between the circumferentially adjacent roller bearing elements thereof. Sealing arrangements providing the latter function, other than those illustrated and described herein, will be obvious or suggested to those skilled in the art upon reading the foregoing description of the preferred embodiments. Accordingly, it is to be distinctly understood that the foregoing descriptive matter is to be interpreted merely as illustrative of the present invention and not as a limitation.

Having thus described the invention, it is claimed:

1. A wheel and axle assembly for a vehicle having an onboard system for controlling the pressure of air in a tire of the vehicle, said system including a source of air under pressure, said assembly including axle means having an axis and axially outer and inner ends, wheel means carrying said tire and including hub means surrounding said axle means in radially spaced relationship thereto, first and second sealing means axially spaced apart and sealingly engaging between said axle means and hub means to provide a sealed air chamber therewith, axially spaced apart first and second bearing units between said axle means and hub means and supporting said hub means for rotation relative to said axle means about said axis, said first bearing unit being at said axially inner end of said axle means and in said sealed air chamber, each of said bearing units including radially spaced apart inner and outer race means and circumferentially adjacent rotatable bearing elements therebetween, said inner and outer race means and said circumferentially adjacent bearing elements providing spaces therebetween axially across said bearing units, said first sealing means providing a radially sealed air path between said hub means and said axle means axially inwardly of said first bearing unit, said air path communicating said sealed air chamber with said source of air under pressure axially across said first bearing unit through said spaces between said circumferentially adjacent bearing elements and said inner and outer race means thereof, and air flow passageway means opening into said air chamber axially outwardly of said first bearing unit for communicating said air chamber with said tire.

2. The wheel and axle assembly according to claim 1, and baffle means in said air chamber to direct the flow of air between said first bearing unit and said air flow passageway means.

3. The wheel and axle assembly according to claim 1, wherein said second sealing means is axially inwardly of said second bearing unit.

4. The wheel and axle assembly according to claim 1, wherein said second sealing means is axially outwardly of said second bearing unit.

5. The wheel and axle assembly according to claim 4, wherein said axially outer end of said axle means includes end face means, end nut means on said outer end of said axle means, said nut means having circumferentially extending radially outwardly facing sealing surface means and radially inwardly extending flange means axially facing said end face means, said second sealing means including first annular seal member means on said hub means radially engaging said sealing surface means and second annular seal member means axially between said flange means and said end face means.

6. The wheel and axle assembly according to claim 1, wherein said air chamber includes an annular space axially between said bearing units and having a radially inner surface provided by said axle means and a radially outer surface provided by said hub means, and baffle means in said annular space to direct the flow of air between said first bearing unit and said air flow passageway means.

7. The wheel and axle assembly according to claim 6, wherein said baffle means includes annular sleeve means extending axially between said bearing units and radially dividing said annular space into radially inner and radially outer hub chambers, said air flow passageway means opening through said hub means into said radially outer hub chamber.

8. The wheel and axle assembly according to claim 7, wherein said space between said bearing elements and said inner and outer race means of said first bearing unit communicates with said radially inner hub chamber.

9. The wheel and axle assembly according to claim 8, wherein said baffle means includes annular wall means extending radially inwardly of said annular sleeve means and having inner edge means spaced radially outwardly from said inner surface of said annular space.

10. The wheel and axle assembly according to claim 9, wherein said baffle means includes means providing radial air flow passageway means through said sleeve means between said radially inner and outer hub chambers.

11. The wheel and axle assembly according to claim 8, wherein said baffle means includes means providing radial air flow passageway means through said sleeve means between said radially inner and outer hub chambers.

12. The wheel and axle assembly according to claim 11, wherein said baffle means includes annular wall means extending radially outwardly of said annular sleeve means and having radial outer edge means spaced radially inwardly from said outer surface of said annular space.

13. The wheel and axle assembly according to claim 12, wherein said air flow passageway means opening through said hub means into said outer hub chamber includes bushing means extending radially inwardly from said outer surface of said annular space and having a radially inner end spaced radially outwardly from said annular sleeve means.

14. The wheel and axle assembly according to claim 13, wherein said radially outer edge means of said annular wall radially overlaps said radially inner end of said bushing means.

15. The wheel and axle assembly according to claim 11, wherein said second sealing means is radially between said annular sleeve means and said inner surface of said annular space.

16. The wheel and axle assembly according to claim 11, wherein said baffle means includes a plurality of annular walls axially spaced apart and extending radially inwardly of said annular sleeve means and having radially inner edge means spaced radially outwardly from said inner surface of said annular space.

17. The wheel and axle assembly according to claim 16, wherein said baffle means further includes annular wall means extending radially outwardly of said annular sleeve means and having radial outer edge means spaced radially inwardly from said outer surface of said annular space.

18. The wheel and axle assembly according to claim 17, wherein said second sealing means is radially between said annular sleeve means and said inner surface of said annular space.

19. The wheel and axle assembly according to claim 17, wherein said axially outer end of said axle means includes end face means, end nut means on said outer end of said axle means, said nut means having circumferentially extending radially outwardly facing sealing surface means and radially inwardly extending flange means axially facing said end face means, said second sealing means including first annular seal member means on said hub means radially engaging said sealing surface means and second annular seal member means axially between said flange means and said end face means.

20. The wheel and axle assembly according to claim 17, wherein said first sealing means includes first and second seal member means, means mounting said first seal member means on said axle means, and means mounting said second seal member means on said hub means for rotation therewith in sealing engagement with said first seal member means, said means mounting said first seal member means on said axle means including means adapted to be connected in flow communication with said source of air.

21. The wheel and axle assembly according to claim 20, wherein said second sealing means is radially between said annular sleeve means and said inner surface of said annular space.

22. The wheel and axle assembly according to claim 20, wherein said axially outer end of said axle means includes end face means, end nut means on said outer end of said axle means, said nut means having circumferentially extending radially outwardly facing sealing surface means and radially inwardly extending flange means axially facing said end face means, said second sealing means including first annular seal member means on said hub means radially engaging said sealing surface means and second annular seal member means axially between said flange means and said end face means.

23. The wheel and axle assembly according to claim 1, wherein said first sealing means includes first and second seal member means, means mounting said first seal member means on said axle means, and means mounting said second seal member means on said hub means for rotation therewith in sealing engagement with said first seal member means, said means mounting said first seal member means on said axle means including means adapted to be connected in flow communication with said source of air.

24. The wheel and axle assembly according to claim 23, wherein said first and second seal member means have radially opposed sealing surfaces in facial engagement with one another.

25. The wheel and axle assembly according to claim 24, wherein said second sealing means is axially inwardly of said second bearing unit.

26. The wheel and axle assembly according to claim 25, wherein said second sealing means is radially between said annular sleeve means and said inner surface of said annular space.

27. The wheel and axle assembly according to claim 24, wherein said second sealing means is axially outwardly of said second bearing unit.

28. The wheel and axle assembly according to claim 27, wherein said axially outer end of said axle means includes end face means, end nut means on said outer end of said axle means, said nut means having circumferentially extending radially outwardly facing sealing surface means and radially inwardly extending flange means axially facing said end face means, said second sealing means including first annular seal member means on said hub means radially engaging said sealing surface means and second annular seal member means axially between said flange means and said end face means.

29. The wheel and axle assembly according to claim 24, wherein said air chamber includes an annular space axially between said bearing units and having a radially inner surface provided by said axle means and a radially outer surface provided by said hub means, and baffle means in said annular space to direct the flow of air between said first bearing unit and said air flow passageway means, said baffle means including annular sleeve means extending axially between said bearing units and radially dividing said annular space into radially inner and radially outer hub chambers, said air flow passageway means opening through said hub means into said radially outer hub chamber.

30. The wheel and axle assembly according to claim 29, wherein said space between said bearing elements and said inner and outer race means of said first bearing unit communicates with said radially inner hub chamber, and said baffle means includes means providing radial air flow passageway means through said sleeve means between said radially inner and outer hub chambers.

31. The wheel and axle assembly according to claim 30, wherein said baffle means includes annular wall means extending radially inwardly of said annular sleeve means and having inner edge means spaced radially outwardly from said inner surface of said annular space, and annular wall means extending radially outwardly of said annular sleeve means and having radial outer edge means spaced radially inwardly from said outer surface of said annular space.

32. The wheel and axle assembly according to claim 31, wherein said second sealing means is radially between said annular sleeve means and said inner surface of said annular space.

33. The wheel and axle assembly according to claim 31, wherein said axially outer end of said axle means includes end face means, end nut means on said outer end of said axle means, said nut means having circumferentially extending radially outwardly facing sealing surface means and radially inwardly extending flange means axially facing said end face means, said second sealing means including first annular seal member means on said hub means radially engaging said sealing surface means and second annular seal member means axially between said flange means and said end face means.

* * * * *